(12) United States Patent
Ben-Zvi (10) Patent No.: US 7,167,921 B1
(45) Date of Patent: Jan. 23, 2007

(54) FULL DUPLEX RE-TRANSMITTER

(75) Inventor: Nir Ben-Zvi, Arad (IL)

(73) Assignee: Eyeblaster, Inc., New York, NY (US)

( * ) Notice: Subject to any disclaimer, the term of this patent is extended or adjusted under 35 U.S.C. 154(b) by 453 days.

(21) Appl. No.: 09/704,435

(22) Filed: Nov. 2, 2000

(30) Foreign Application Priority Data

Nov. 18, 1999 (IL) ..................... 133039

(51) Int. Cl.
*G06F 15/173* (2006.01)

(52) U.S. Cl. .............. 709/238; 709/203; 709/217; 709/226; 709/231

(58) Field of Classification Search ........ 709/203, 709/225, 202, 231, 223, 224, 226, 227, 238, 709/239, 217
See application file for complete search history.

(56) References Cited

U.S. PATENT DOCUMENTS

| | | | | |
|---|---|---|---|---|
| 5,586,257 A | * | 12/1996 | Perlman .................. | 463/42 |
| 5,864,854 A | * | 1/1999 | Boyle ..................... | 707/10 |
| 5,884,031 A | * | 3/1999 | Ice ........................ | 709/203 |
| 5,884,046 A | * | 3/1999 | Antonov ................. | 709/238 |
| 5,938,737 A | | 8/1999 | Smallcomb et al. | |
| 6,070,191 A | * | 5/2000 | Narendran et al. ...... | 709/226 |
| 6,128,279 A | * | 10/2000 | O'Neil et al. ........... | 709/226 |
| 6,324,565 B1 | * | 11/2001 | Holt, III ................. | 709/203 |
| 6,334,151 B1 | * | 12/2001 | Bolam et al. ........... | 709/225 |
| 6,374,289 B2 | * | 4/2002 | Delaney et al. ......... | 709/238 |
| 6,405,256 B1 | * | 6/2002 | Lin et al. ................ | 709/231 |
| 6,446,109 B2 | * | 9/2002 | Gupta .................... | 709/203 |
| 6,453,335 B1 | * | 9/2002 | Kaufmann .............. | 709/203 |
| 6,567,857 B1 | * | 5/2003 | Gupta et al. ............ | 709/238 |
| 6,606,315 B1 | * | 8/2003 | Albert et al. ........... | 370/352 |
| 6,633,901 B1 | * | 10/2003 | Zuili ..................... | 709/232 |
| 6,643,682 B1 | * | 11/2003 | Todd et al. ............. | 709/202 |

* cited by examiner

*Primary Examiner*—David Wiley
*Assistant Examiner*—Phuoc C. Nguyen
(74) *Attorney, Agent, or Firm*—John P. White; Cooper & Dunham LLP (57) ABSTRACT

Method for efficiently exploiting an upstream channel bandwidth of full-duplex connection between a user and network. Data from the network is received by a user. The data is stored on the user's storage device, for a predetermined period of time for further use. The received data is then re-transmitted to other users, during download time or after downloading is completed. The data from the user's location may be re-transmitted to the users through the upstream channel bandwidth, in response to a request, or according to pre-defined operation instructions.

11 Claims, 6 Drawing Sheets

FULL DUPLEX RE-TRANSMITTER

FIELD OF THE INVENTION

The present invention relates to data transfer over networks that connect users by full-duplex connections. It also relates to QoS (Quality of Service), streaming and caching methods.

BACKGROUND OF THE INVENTION

The tremendous increase in the use of the Internet makes it necessary to decrease the response time of the Internet. The increased use of video and audio applications makes it even worse. Video and audio information volume is much bigger in terms of data storage than textual or even stills graphic information. Moreover, due to its nature, video and audio information should flow continuously, otherwise the information will not be understandable.

In order to overcome such problems, an effort is made by hosting services to bring the contents hosted by them as close as possible to the "last mile". This is usually done for specific contents (video, audio, HTML) and uses a costly infrastructure composed of hundreds of servers located mostly in the USA. Companies such as Akamai, Intervu, Sandpiper and Inkotomi follow this paradigm. The basic idea is to duplicate the information to all the servers and once a request arrives, locate the nearest server and direct the request to that server.

New terms were invented to deal with these issues, such as "streaming" (i.e. information that flows continuously) and QoS (Quality of Service). On the Internet and other networks, QoS assumes that transmission rate, error rates, and other characteristics can be measured, improved, and, to some extent, guaranteed in advance. QoS is of particular concern for the continuous transmission of high-bandwidth video and multimedia information.

One of the prior art methods dealing with the problems is the "Proxy Server". A "proxy server" is a system that caches data items from other servers to speed up access. Its operation principle is that data reaching the proxy server is stored on the server's storage memory, and when further requests for this information arrives, the proxy fetches it from its own memory instead of downloading the data from the remote station where it resides permanently.

Internet Service Providers (ISPs) make use of proxy servers to speed-up the data flow of their services, and therefore to improve their service. Security and administrative control are co-products of the use of proxy servers.

An interesting phenomenon regarding the data flow through the Internet is the fact that most Internet interactions are asymmetric, since the user's requests for information are much smaller in data size terms than the resulting information received. For instance, a typical request for Internet page looks like "http://www.server.com"; however, this 22-byte request causes reception of an HTML page that usually contains visual information such as picture files or video files, and sometimes even vocal information. The size of a stills picture file is at least ten thousands bytes, and the size of video and audio files is hundreds of thousands of bytes. Therefore, a ratio of 1:10 between the upstream and the downstream data volume is not rare.

The asymmetry of traffic volume between downstream and upstream directions in networks such as the Internet has already been observed, and the prior art, e.g. U.S. Pat. No. 5,938,737, have attempted to exploit it for various purposes.

As regards proxies, the ultimate proxy server is one whose storage capacity is endless. Such a proxy server is impossible to create since the storage capacity is finite.

It is an object of the present invention to provide a method for utilizing network resources more efficiently by using the receiver's local network connections and upstream bandwidth for data streaming.

It is a further object of the invention to provide a method that increases the amount of the cache capacity without requiring the use of a traditional proxy server, nor the addition of physical mass-storage apparatus to servers in the network.

It is yet a further object of the invention to provide a scalable method the cache capacity of which increases as the number of users connected to a network increases.

It is another object of the invention to provide a method that makes use of the upstream bandwidth in order to achieve better performance of data flow in networks.

It is still another object of the invention to provide a method for improving the QoS in full-duplex connections on applications such as Internet, satellites, DSL, etc., which overcomes the drawbacks of the prior art.

It is yet another object of the invention to provide a method for improving the QoS, which is not bound to a specific protocol or data type.

It is a further object of the invention to provide a method, which improves the QoS on Web multi-cast transmissions.

It is another object of the invention to provide a method for decreasing the network load.

Other objects and advantages of the invention will become apparent as the description proceeds.

SUMMARY OF THE INVENTION

In one aspect, the invention is directed to a method for efficiently exploiting an upstream channel bandwidth of full-duplex connection between a user and network, comprising:
 a) receiving data from said network by at least one user;
 b) storing said data on said user's storage device for a predetermined period of time for further use; and
 c) re-transmitting said received data to other users.

According to a preferred embodiment of the invention the re-transmission of said received data to said users is carried out during download time. According to another preferred embodiment of the invention the re-transmission of said received data to said users is carried out after downloading is completed.

The invention is further directed to a method comprising:
 a) receiving said data by said user;
 b) storing said received data on said user's computer system; and
 c) re-transmitting said data from the user's location to said users through said upstream channel bandwidth in response to a request or according to pre-defined operation instructions.

According to a preferred embodiment of the invention the method comprises:
 a) receiving data on said user's computer system;
 b) causing said received data to be re-transmitted through said upstream channel bandwidth from said user to a first group of one or more other users;
 c) causing said received data to be re-transmitted through said upstream channel bandwidth from said first group of users to a further group of one or more other users; and d) repeating step (c) for all said users requesting the same said data.

Optionally, said data is transmitted to said user from a plurality of other users. Furthermore, the transmission of data from one user to one or more other user(s) can be carried out with delay.

In another preferred embodiment of the invention the method comprises:
a) receiving data on said user's computer system;
b) re-transmitting said received data through said upstream channel bandwidth to a dedicated server for storage; and
c) retrieving said stored data from said dedicated server for other purposes.

In another aspect, the invention is directed to a system for managing data flow in a data network, comprising:
a) a coordination center for tracking data entities distributed over said data network;
b) a plurality of users having computer means connected to said data network via a full-duplex connection, said computer means comprising or being coupled to memory means; and
c) software and/or hardware means for re-transmitting data from the computer of each user via the upstream channel of his full duplex connection to other users connected to said network.

The coordination center may comprise storage means and software/hardware components for storing information related to the data passed through the network, and for data retrieval. Furthermore, the users can be provided with software/hardware components, suitable to re-transmit the data received in said user's computer to the other users on the network according to instructions from the coordination center or according to pre-defined operation instructions.

According to a preferred embodiment of the invention the users are provided with software/hardware components suitable to send information to the coordination center representative of the upstream bandwidth available, and of the contents stored in the memory means associated with the user's computer, that are available for retransmission.

BRIEF DESCRIPTION OF DRAWINGS

All the above and other characteristics and advantages of the invention will be better understood through the following illustrative and non-limitative description of preferred embodiments thereof, with reference to the appended drawings, wherein.

DETAILED DESCRIPTION OF PREFERRED EMBODIMENTS

Figure 1:
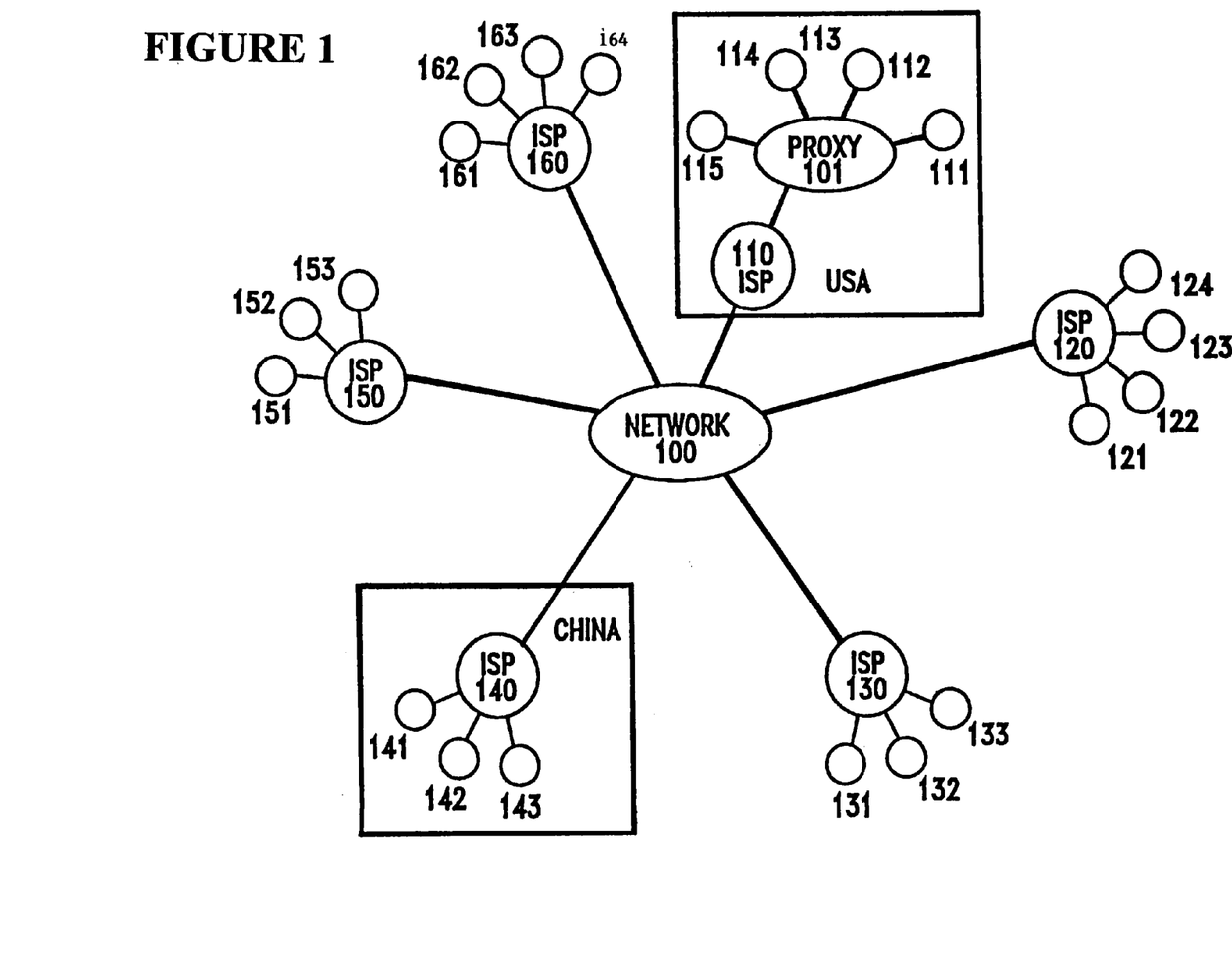
FIG. 1 schematically illustrates a typical layout of a prior art network, such as the Internet.

FIG. 1 schematically illustrates a typical layout of a prior art network, such as the Internet. Users 111 to 115, 121 to 124 131 to 133, 141 to 143, 151 to 153, and 161 to 164 are connected to Internet Service Providers 110, 120, 130, 140, 150 and 160, which are connected to network 100. While Internet Service Provider (ISP) 110, which is located in the USA, is using proxy server 101, Internet Service Provider (ISP) 140 which is located in China, is not using a proxy server. Proxy server 101 stores temporary files that arrive at the server. The next time that server 110 receives a request to download a file that is already stored on the server, instead of downloading it from the location where it permanently resides, the proxy server will send the file in it.

Before sending the file to the user, the proxy server should verify that the permanent file was not updated since the last upload to the server. In terms of data volume, in comparison to the entire-file download, this operation is negligible. Therefore, from the user's point of view, there is an improvement of the quality of service, since the waiting time to download is shorter.

Figure 2:
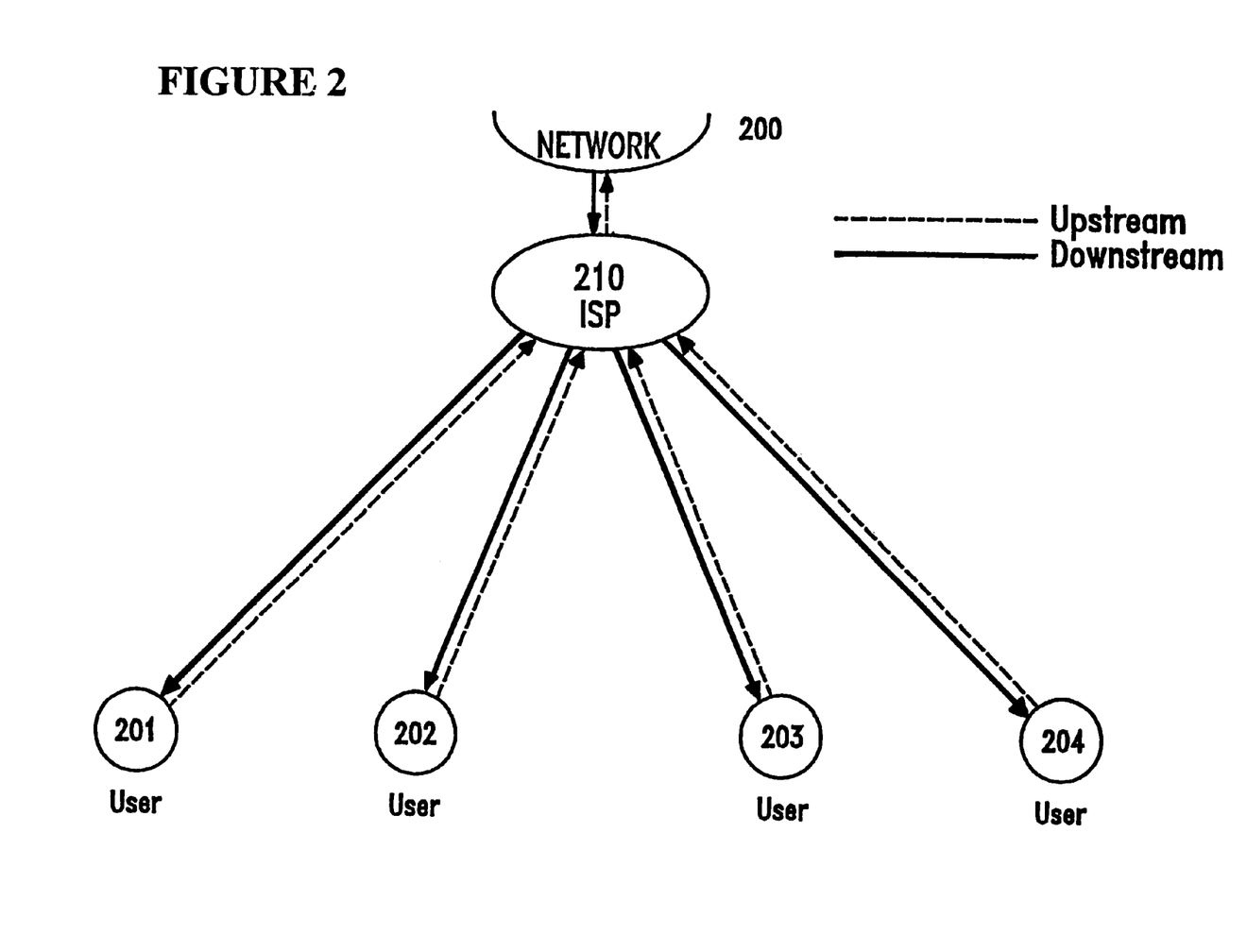
FIG. 2 schematically illustrates the downstream and upstream data flow in a prior art network.

FIG. 2 schematically illustrates the downstream and upstream data flow in a prior art network. The downstream direction is from network 200 to ISP (Internet Service Provider) 210, and from ISP 210 to users 201 to 204. Due to the nature of the Internet, there is a meaningful gap between the volume of data that flows in the downstream direction and the volume of data that flows in the upstream direction. The upstream flow is marked by dashed lines, and the downstream flow is marked by continuous lines.

Figure 3:
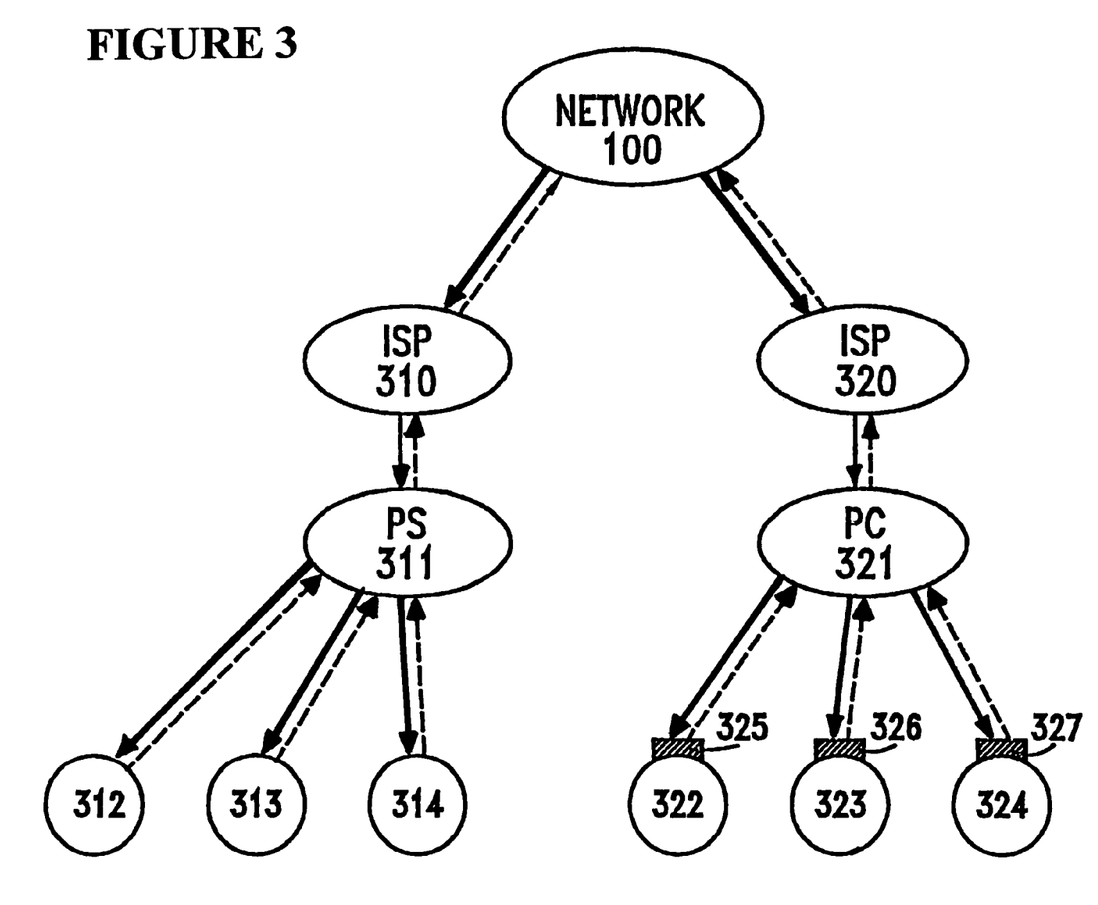
FIG. 3 schematically illustrates the data flow when using a prior art proxy server compared to the data flow when using a "Proxy Coordinator", according to a preferred embodiment of the invention.

FIG. 3 schematically illustrates data flow occurring when using a proxy server and data flow occurring when using a system according to a preferred embodiment of the invention, that will be termed hereinafter "Proxy Coordinator", for the sake of brevity. While Internet Service Provider (ISP) 310 is using proxy server 311, Internet Service Provider (ISP) 320 is using a "Proxy Coordinator", according to an embodiment of the invention. Schematically the two systems may appear similar, however there is a meaningful difference between them. While proxy server (PS) 311 stores the whole-received information for future requests, Proxy Coordinator (PC) 321 stores only the pointers to the permanent file and to the last one or more users that received this information. This difference is very significant, since the amount of information proxy coordinator (PC) 321 has to store is much smaller than the amount of information proxy server (PS) 311 has to store. In order to communicate with the Proxy Coordinator, the user's computer system should be modified, i.e. to contain a software component, such as enhancement or add-in to the browser. The software component is indicated at 325, 326, and 327 in FIG. 3.

A "pointer" may be, for instance, a URL (Uniform Resource Locator), which is the address of a file (resource) accessible on the Internet.

On the next request for information, the proxy coordinator (PC) verifies that the information is still stored on the user's computer, and if so, the user sends this file (or information) via the upstream channel, which is usually not busy. The delay caused by the verification is not meaningful. It is also possible to ignore the verification stage, and to use other criteria instead, such as the time elapsed since the last download.

This scheme may be implemented in different variations. For instance, the proxy coordinator (PC) can store not only the last destination to which the information was sent, but also all the destinations that received this information in the last hour, or after pre-set period of time.

A typical scenario regarding this scheme is:
1. User 322 initiates a request for an HTML page. The request is sent through its upstream channel.

2. The received HTML file enters into the gateway of ISP (Internet service provider) 320, and is registered at the PC (Proxy Coordinator) 321 storage device.
3. The file is forwarded to user 322.
4. User 324 initiates a request for the same HTML file via PC 321.
5. PC 321 scans its table to find out if this file is registered in its storage.
6. PC 321 sends an order to user 322 to send the HTML file to user 324.
7. User 322 verifies that the file still exists in its cache memory, and if it does exist, user 322 sends the file via its upstream channel to user 324, via PC 321 or directly, depending on the connection between the users.

As will be apparent to the skilled person, the benefits achieved by proxy coordination architecture are: bigger cache capacity in comparison to proxy servers (as the number of users increases, the volume of cache storage increases), local data flow activity rather than global data flow activity and therefore better QoS, and faster transfer (as the number of receivers increases, the number of potential transmitters increases).

Another embodiment of the invention is particularly useful in the field of streaming. Improving the QoS on streaming issues can be achieved by sharing the transmission effort with the users, where users are using their upstream channel to send data to other users.

In the case where there are 63 pre-determined users that are listening to an 8-kbit audio Web-cast: The server that initiates the Web-cast can either send the signal to all 63 users, which means that it has to send 504 kbit, or it can make use of the users as re-transmitters, according to the present invention. In this way, instead of 504 kbit, the Web-cast server would send one stream of 8 kbit to the first user, which would then send it to the next user and so on. The slight delay in receipt from one user to the other is usually meaningless for common users such as video or music.

Figure 4:
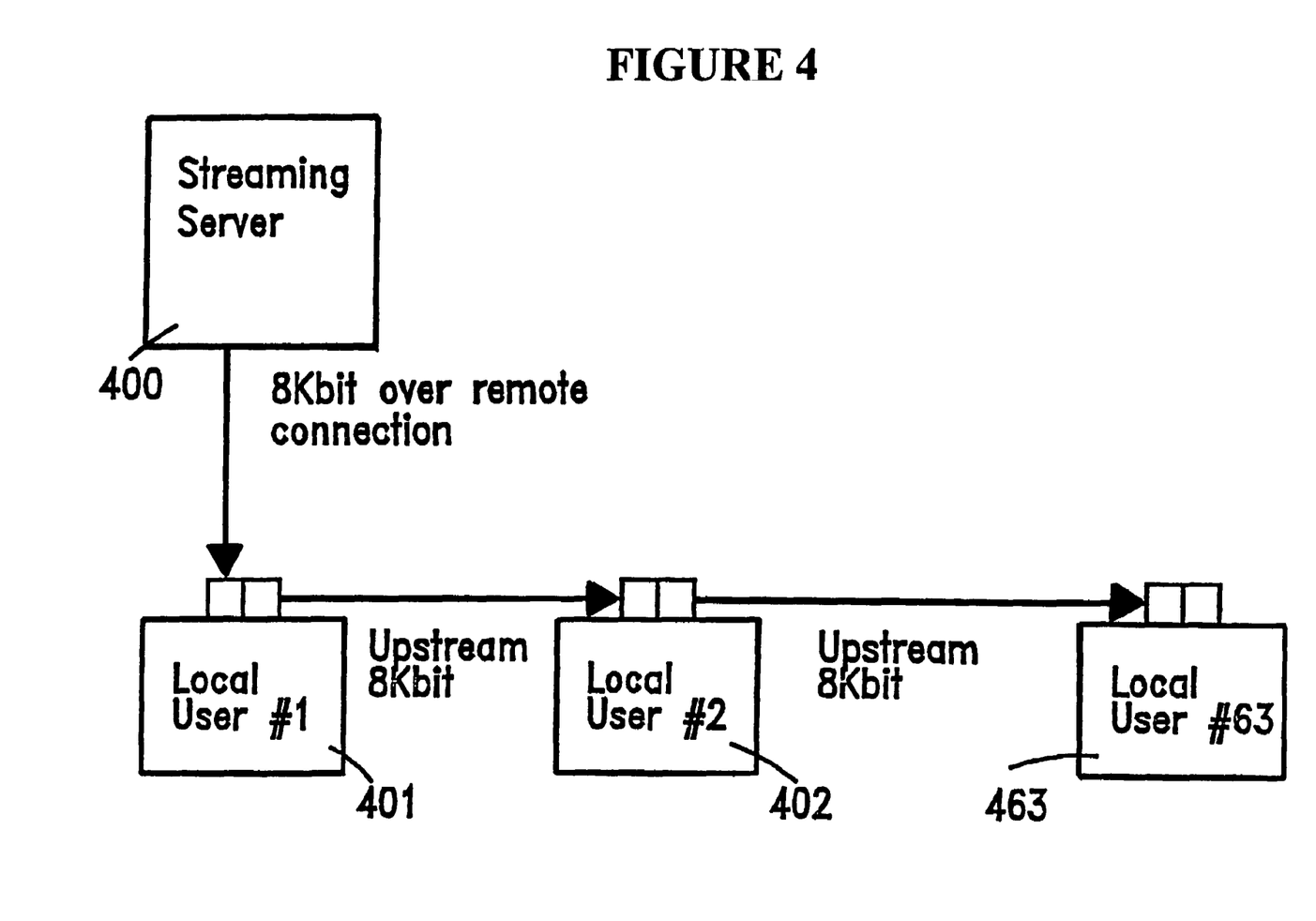
FIG. 4 illustrates the data flow in a serial data flow scheme, according to a preferred embodiment of the invention.

FIG. 4 illustrates the data flow in a serial flow scheme, according to a preferred embodiment of the invention. According to this scheme, only user 401 receives the transmission from the transmitter 400. User 402 receives the transmission from user 401, and so on. The drawback of this method is that the last user, 463, receives the transmission stream only after it has been through all the other users. Of course, a Proxy Coordinator (not shown) must be used to coordinate transmission from one user to the other.

Figure 5:
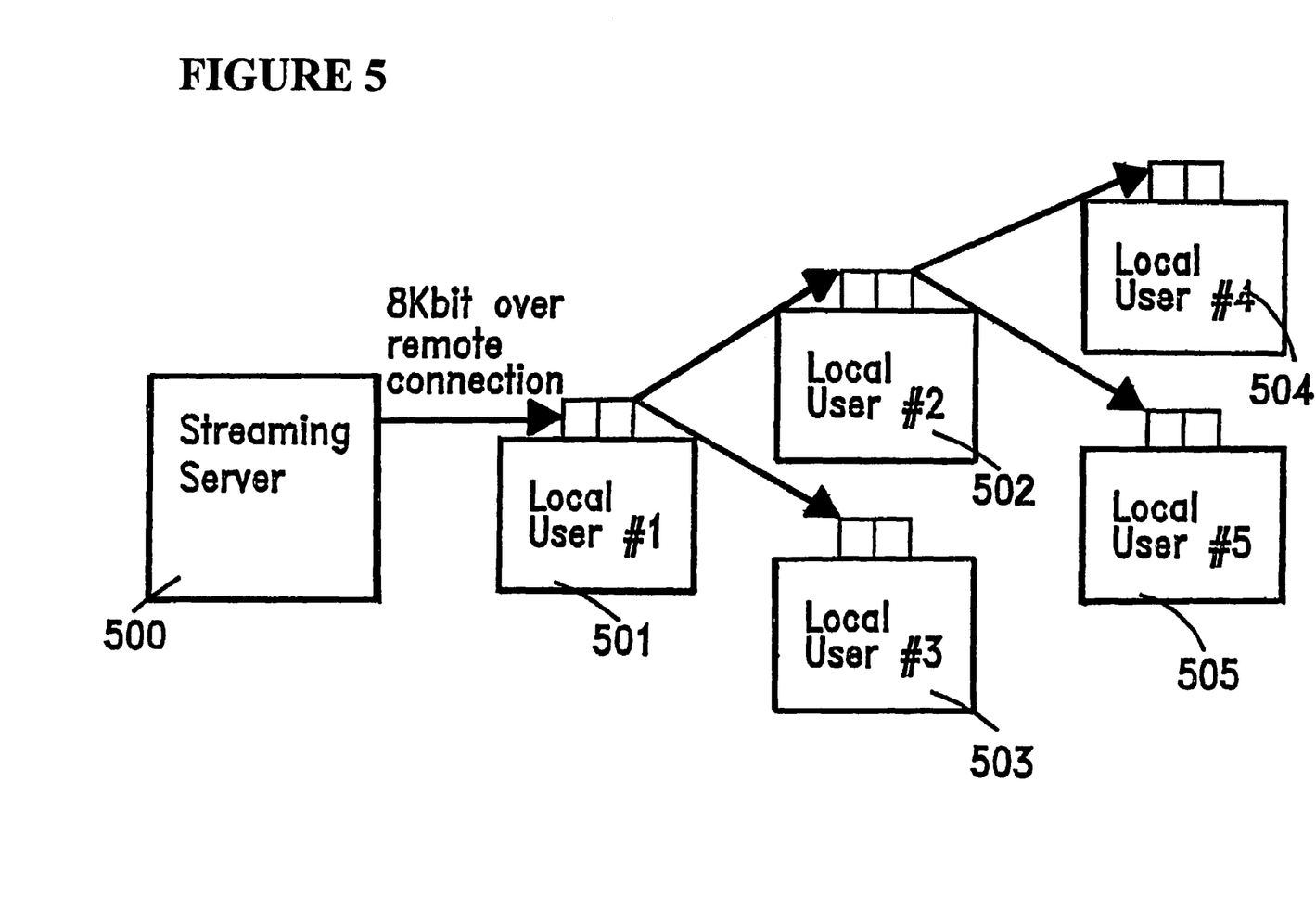
FIG. 5 illustrates the data flow in a tree data flow scheme, according to other preferred embodiment of the invention.

Although this delay is measured in seconds or even $10^{ths}$ of a second, it is possible to diminish this delay by employing a different type of architecture. For example, since the audio transmission is 8 kbit and the typical modem nowadays has a capability of at least 24 kbit, it is possible to assign each receiver to transmit to two others. This constitutes a tree structure whereby, instead of waiting for 62 transmissions, the last user gets the signal after 5 tree levels, i.e. 5 transmissions. FIG. 5 illustrates the tree data flow architecture, according to a preferred embodiment of the invention. The streaming server 500 sends the signal, which may be audio transmission, only to the first user 501. User 501 sends the transmission to users 502 and 503. User 502 sends the transmission to user 504 and 505, and so on.

In order to achieve better QoS in video and music broadcasts, such applications may perform the following operations:
a) To ensure that each user receives transmission from two transmitters or more. When one data source fails, the other source is still transmitting. From the receiver's point of view it means better QoS. The multiple transmission may increase the incoming traffic but can be adjusted so that it will increase the overall quality of the received transmission.
b) Regarding video and music applications: a delay of a few seconds doesn't influence the QoS. In such applications, only the streaming feature is meaningful. Therefore, such applications can improve their QoS by using a time buffer of a few seconds. The presence of such a buffer means that each transmitter stores a few seconds of broadcast, and when the source fails, the transmission is not interrupted during the period of the time stored in the buffer. If the failed source recovers during the stored period of time, the streaming will not be affected.

Combination of the two methods can achieve even better results.

According to another preferred embodiment of the invention, a different use of the upstream bandwidth can be implemented when sent data should be recorded for further use, such as evidence. An example of this preferred embodiment is an insurance application, where the data received by the clients should be recorded in order to prove that an individual user has been exposed to this information. According to the invention, such an implementation can be performed by sending the received information to a so-called "recording server", which records the information received by the client. The information is sent from the client's position to the recording server via the upstream channels.

Figure 6:
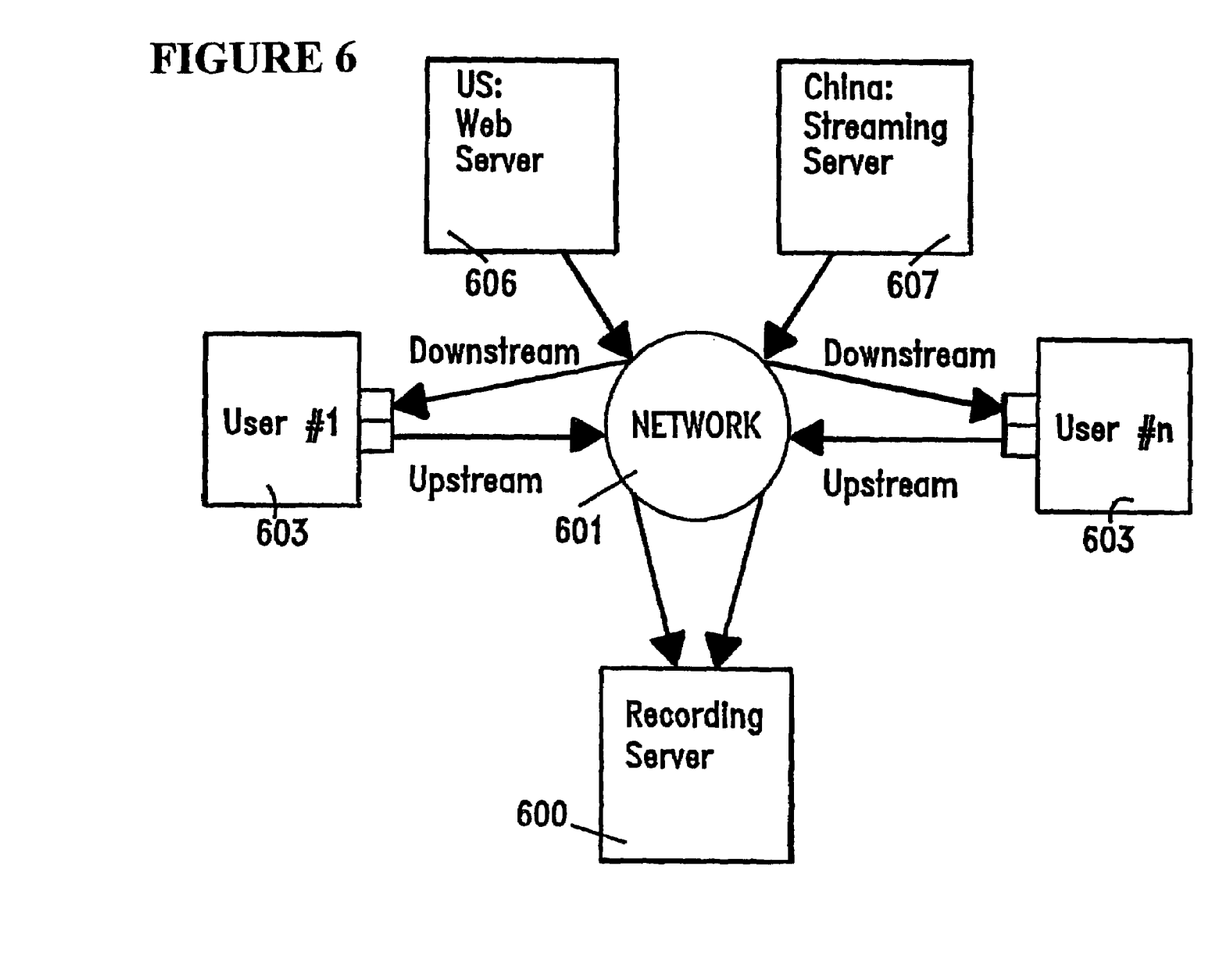
FIG. 6 illustrates a recording server, according to a preferred embodiment of the invention.

FIG. 6 illustrates a recording server, according to this embodiment of the invention. Users 603 are connected to network 601 through a full duplex modem connection. A recording server 600 can also be present, as are, for instance, a US Web server 606 and Chinese Streaming Server 607. Each user re-transmits the data to the recording server 600 through the mostly free upstream channel.

The above examples and description have of course been provided only for the purpose of illustration, and are not intended to limit the invention in anyway. As will be appreciated by the skilled person, the invention can be carried out in a great variety of ways, employing more than one technique from those described above, all without exceeding the scope of the invention.

The invention claimed is:

1. A method for efficiently exploiting an upstream channel bandwidth of full-duplex connection between user terminal and data network, said method comprising:

providing a coordination center to monitor data files downloaded by user terminals over said data network and maintain a register of the locations and file identifier of each of the downloaded data files amongst said user terminals;

receiving by the coordination center from a first user terminal a request for a data file;

determining by the coordination center whether a location of the requested data file is registered in the register, and if registered, determining a second user terminal corresponding to the registered location of the requested data file;

sending an instruction from the coordination center to the second user terminal to send the requested data file to the first user terminal through the upstream channel bandwidth of the second user terminal receiving said requested data file on said first user terminal;

causing said received data file to be re-transmitted through said upstream channel bandwidth from said first user terminal to a first group of one or more other user terminals; and causing said received data file to be re-transmitted through said upstream channel bandwidth from said first group of user terminals to a further group of one or more other user terminals, and repeating this step for all said user terminals requesting the same said data file.

2. A method according to claim 1, wherein the re-transmission of said requested data file from said second terminal is carried out during download time.

3. A method according to claim 1, wherein the re-transmission of said requested data file from said second terminal is carried out after downloading is completed.

4. A method according to claim 1, comprising:
a) receiving said requested data file by said first user terminal;
b) storing said received data file on said first user terminal; and
c) re-transmitting said data file from the first user terminal to other user terminals through said upstream channel bandwidth in response to a request or according to pre-defined operation instructions.

5. A method according to claim 1, wherein said data file is transmitted to said first user terminal from a plurality of other user terminals.

6. A method according to claim 1, wherein the transmission of said data file from the first user terminal to one or more user terminals is carried out with delay.

7. A method according to claim 1, comprising:
a) receiving said requested data file on said first user terminal;
b) re-transmitting said received data file through said upstream channel bandwidth to a dedicated server for storage; and
c) retrieving said stored data file from said dedicated server for other purposes.

8. A system for efficiently exploiting an upstream channel bandwidth of full-duplex connection between user terminal and data network, said system comprising:
a plurality of user terminals connected to said data network via full-duplex connections, each user terminal comprising storage means for storing data files downloaded to the user terminal;

a coordination center coupled to said data network and configured to monitor data files downloaded by the user terminals over said data network and maintain a register of the locations and file identifier of each of the downloaded data files amongst said user terminals, wherein when the coordination center receives from a first user terminal a request for a data file, the coordination center (i) determines whether a location of the requested data file is registered in the register, and (ii) if registered, determines a second user terminal corresponding to the registered location of the requested data file, and sends an instruction to the second user terminal to send the requested data file to the first user terminal through the upstream channel bandwidth of the second user terminal, and wherein when said requested data file is received on said first user terminal, said received data file is re-transmitted through said upstream channel bandwidth from said first user terminal to a first group of one or more other user terminals, and said received data file is re-transmitted through said upstream channel bandwidth from said first group of user terminals to a further group of one or more other user terminals.

9. A system according to claim 8, wherein the coordination center comprises storage means and software/hardware component for storing information related to the data file passed through the network and for retrieval of the stored information.

10. A system according to claim 8, wherein the user terminals are provided with software/hardware components, suitable to re-transmit the data files received by the user terminals to the other user terminals on the network according to instruction from the coordination center or according to pre-defined operation instructions.

11. A system according to claim 8, wherein the user terminals are provided with software/hardware components suitable to send information to the coordination center representative of the upstream bandwidth available, and of the contents stored in the storage means of the user terminals, that are available for retransmission.

* * * * *